US012662133B2

(12) United States Patent
Secondi et al.

(10) Patent No.: US 12,662,133 B2
(45) Date of Patent: Jun. 23, 2026

(54) METHOD FOR DETERMINING THE DROWSINESS OR ATTENTION LEVEL OF THE DRIVER OF A ROAD VEHICLE, AND ROAD VEHICLE THEREOF

(71) Applicant: FERRARI S.P.A., Modena (IT)

(72) Inventors: Andrea Secondi, Modena (IT);
Gianmarco Limonta, Modena (IT)

(73) Assignee: FERRARI S.P.A., Modena (IT)

( * ) Notice: Subject to any disclaimer, the term of this patent is extended or adjusted under 35 U.S.C. 154(b) by 253 days.

(21) Appl. No.: 18/311,282

(22) Filed: May 3, 2023

(65) Prior Publication Data
US 2023/0356723 A1    Nov. 9, 2023

(30) Foreign Application Priority Data

May 4, 2022    (IT) ......................... 102022000009065

(51) Int. Cl.
*B60W 40/09*    (2012.01)
*B60W 50/14*    (2020.01)

(52) U.S. Cl.
CPC ............ *B60W 40/09* (2013.01); *B60W 50/14* (2013.01); *B60W 2420/403* (2013.01); *B60W 2540/18* (2013.01); *B60W 2540/229* (2020.02); *B60W 2540/26* (2013.01)

(58) Field of Classification Search
None
See application file for complete search history.

(56) References Cited

U.S. PATENT DOCUMENTS

| | | | |
|---|---|---|---|
| 2009/0048737 A1* | 2/2009 | Nakagoshi | B60W 40/08 701/44 |
| 2013/0245886 A1* | 9/2013 | Fung | B60W 50/14 701/1 |
| 2018/0105180 A1* | 4/2018 | Fung | A61B 5/1122 |
| 2018/0281848 A1* | 10/2018 | Zegelaar | B62D 15/024 |
| 2019/0232966 A1* | 8/2019 | Prakah-Asante | G06V 20/597 |
| 2021/0221362 A1* | 7/2021 | Matsumura | B60K 28/06 |
| 2021/0237775 A1* | 8/2021 | Bieg | B60W 50/0097 |

FOREIGN PATENT DOCUMENTS

| | | | | |
|---|---|---|---|---|
| DE | 102014219810 A1 * | 3/2016 | | B60W 40/08 |
| DE | 102015208208 A1 * | 11/2016 | | G08G 1/167 |
| KR | 102048186 B1 * | 11/2019 | | B60W 50/14 |

OTHER PUBLICATIONS

Italian Search Report for Application No. 102022000009065; Filing Date: May 4, 2022; Date of Mailing—Dec. 5, 2022, 8 pages.

* cited by examiner

*Primary Examiner* — Rachid Bendidi
*Assistant Examiner* — Nada Mahyoob Alqaderi
(74) *Attorney, Agent, or Firm* — CANTOR COLBURN LLP

(57) ABSTRACT

Method for determining the drowsiness/attention level of the driver of a road vehicle; the method comprises the steps of: detecting at least one steering parameter related to the kinematics of a driver-operated device for steering; where the steering parameter is related to the steering angle and/or the steering speed of the road vehicle; elaborating a steering index as a function of the at least one steering parameter detected; detecting at least one line parameter related to the position of the road vehicle within a lane; processing a line index as a function of the at least one line parameter detected; computing a driver drowsiness/attention index as a function of a combination of the steering index and the line index.

12 Claims, 7 Drawing Sheets

FIG. 3

METHOD FOR DETERMINING THE DROWSINESS OR ATTENTION LEVEL OF THE DRIVER OF A ROAD VEHICLE, AND ROAD VEHICLE THEREOF

CROSS-REFERENCE TO RELATED PATENT APPLICATIONS

This patent application claims priority from Italian patent application no. 102022000009065 filed on May 4, 2022, the entire disclosure of which is incorporated herein by reference.

TECHNICAL FIELD

The present invention relates to a method for determining the drowsiness/attention level of the road vehicle driver, and a road vehicle thereof.

In particular, the present invention is advantageously, but not exclusively, embodied in a highly performing road vehicle, to which the following description will make explicit reference without thereby losing its generality.

BACKGROUND OF THE INVENTION

Tiredness and drowsiness when driving, as well as lack of attention, are among the most common causes of serious vehicular accidents, which are often caused by a vehicle departing from the lane, which in turn causes the vehicle itself to go off the road, or frontal impacts with vehicles traveling in the opposite direction.

To attempt to prevent such accidents, road vehicle driver monitoring systems (DMS), also referred to as attention monitoring systems (DDAW: Driver drowsiness attention warning) are known.

This technology therefore seeks to identify situations in which the risk of an accident is significant, based on the identification of driver tiredness/attention.

Therefore, such systems usually use infrared sensors to monitor the driver's attention, such as a camera placed on the steering column or the ceiling light of the road vehicle to monitor the driver's face.

In the event that the driver is not paying sufficient attention to the road ahead and a dangerous situation is therefore detected, the system usually warns the driver via light signals (often with a coffee cup-like shape to signal the need for a break) and sounds warning. If nothing is done, some vehicles apply the brakes and activate the "four arrows" (hazard lights) for maximum protection of the driver.

For example, one of the most widespread scales for evaluating the driver's drowsiness/attention level is the KSS scale (Karolinska Sleepiness Scale), which is an objective evaluation (from 1 to 9) of a driver's sleepiness through which it is possible define their physical state while driving.

However, the accuracy of known systems is subject to potential evaluation errors since the parameters with which the systems are calibrated are based on statistical and non-punctual user data. In particular, especially in relation to the facial monitoring of the driver, different users can demonstrate drowsiness or lack of attention in substantially different ways (different drooping of the eyelids, frequency of blinking, etc.).

Furthermore, the known systems do not consider various boundary conditions which may or may not influence the driver's attention and/or drowsiness. In fact, the same driver could have different attitudes in different psychophysical conditions, generating potential false positives or negatives in the management of dangerous conditions by the monitoring system.

Patent document DE102015208208 relates to a method for detecting drowsiness of the driver of a vehicle. The method comprises a step of reading an exceeding signal as an indication of an imminent crossing of a road line by the vehicle, a step of evaluating a driving trajectory of the vehicle before the moment of reading the exceeding signal and a step providing a drowsiness indication signal using the overshoot signal when the validity value indicates the validity of the overshoot signal.

Patent document US2009048737 disclose a method for detecting drowsiness of the driver of a vehicle, wherein the wakefulness estimator calculates an average steering angle, an average steering angular speed and a corrective steering angle based on the steering angle acquired by a steering angle sensing part. The wakeful state estimate acquires the vehicle's travel speed from a vehicle speed sensing. Awake estimation corrects the computed corrective steering angle with a correction value commensurate with the type of route the vehicle is traveling and estimates the level of awake of the driver based on the post-correction corrective steering angle.

The patent document DE102014219810 relates to a method and a device for determining the drowsiness level of the driver of a vehicle. The method includes a step of determining the driver drowsiness level based on lane violation behaviour by classifying lane violations as performed unconsciously by the driver or consciously by the driver.

An purpose of the present invention is to provide a method for determining the drowsiness/attention level of the driver of a road vehicle, and a road vehicle thereof, which are at least partially free from the drawbacks described above and, at the same time, are easy and cheap regarding the production.

SUMMARY

In accordance with the present invention, a method for determining the drowsiness/attention level of the driver of a road vehicle, and a road vehicle thereof according to what is claimed in the following independent claims and, preferably, in any one of the directly or indirectly dependent claims from independent claims, is provided.

The appended claims describe preferred embodiments of the present invention forming an integral part of the present description.

BRIEF DESCRIPTION OF THE DRAWINGS

The present invention will now be described with reference to the attached drawings, which illustrate some non-limiting embodiments thereof, in which:

FIG. 3 illustrates two plots relating to a steering index respectively calculated for a focused driver and for an inattentive or tired driver;

DETAILED DESCRIPTION

With reference to the enclosed figures, the numeral 1 indicates a road vehicle taken as a whole, provided with two front wheels 2 and two rear wheels 3. Vehicle 1 is a car, which can have front, rear or all-wheel drive, based on the position of one or more propulsion systems.

The same reference numbers and letters in the Fig. identify the same elements or components with the same function.

In the context of this description, the term "second" component does not imply the presence of a "first" component. These terms are in fact used as labels to improve clarity and are not to be understood in a limiting way.

The elements and features illustrated in the various preferred embodiments, including the drawings, can be combined with each other without however departing from the scope of protection of the present application as described below.

Figure 1:
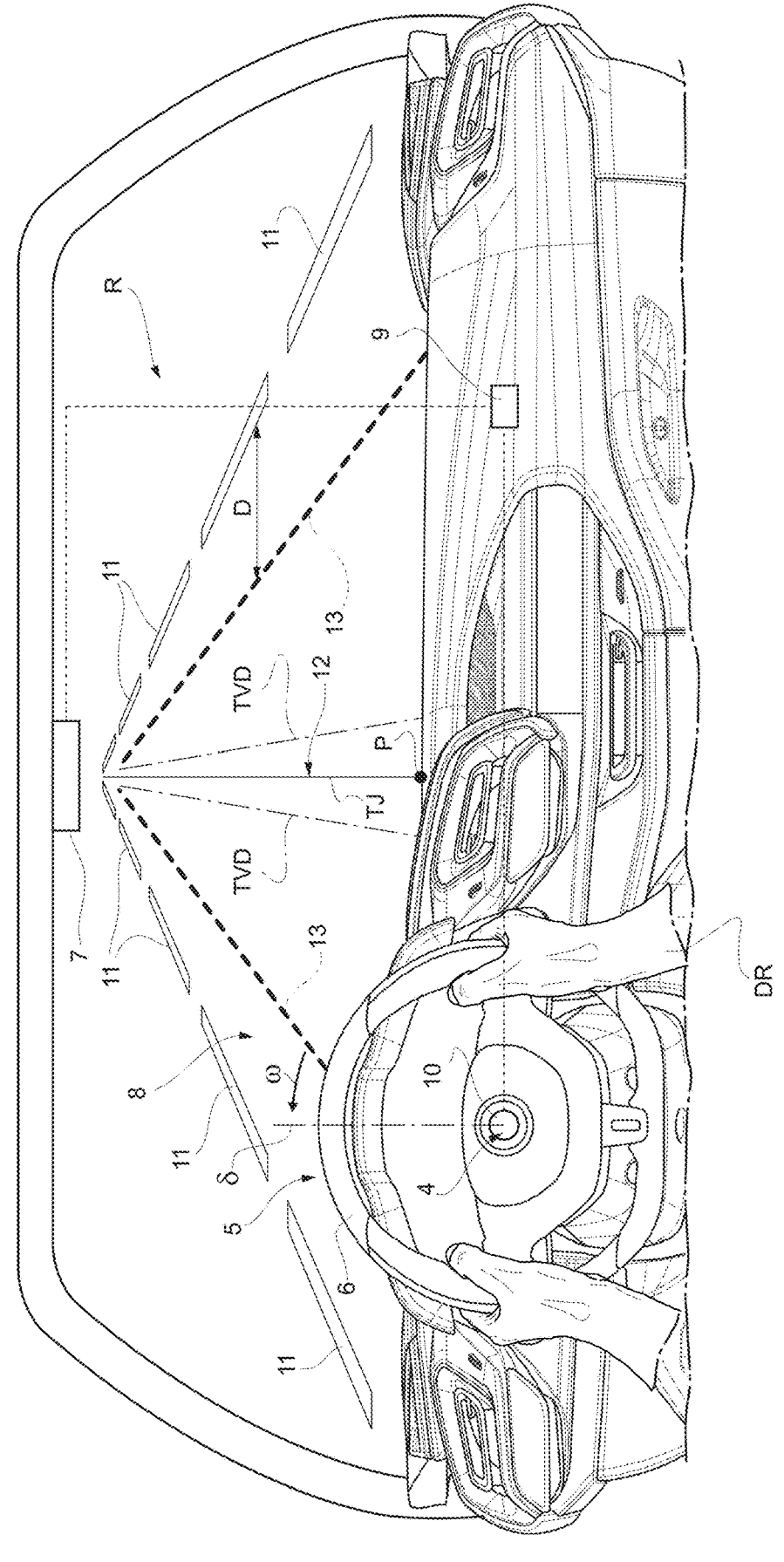
FIG. 1 illustrates a perspective and schematic view, with details removed for the sake of clarity, from the inside of a vehicle according to the present invention driven by a focused driver.
Figure 2:
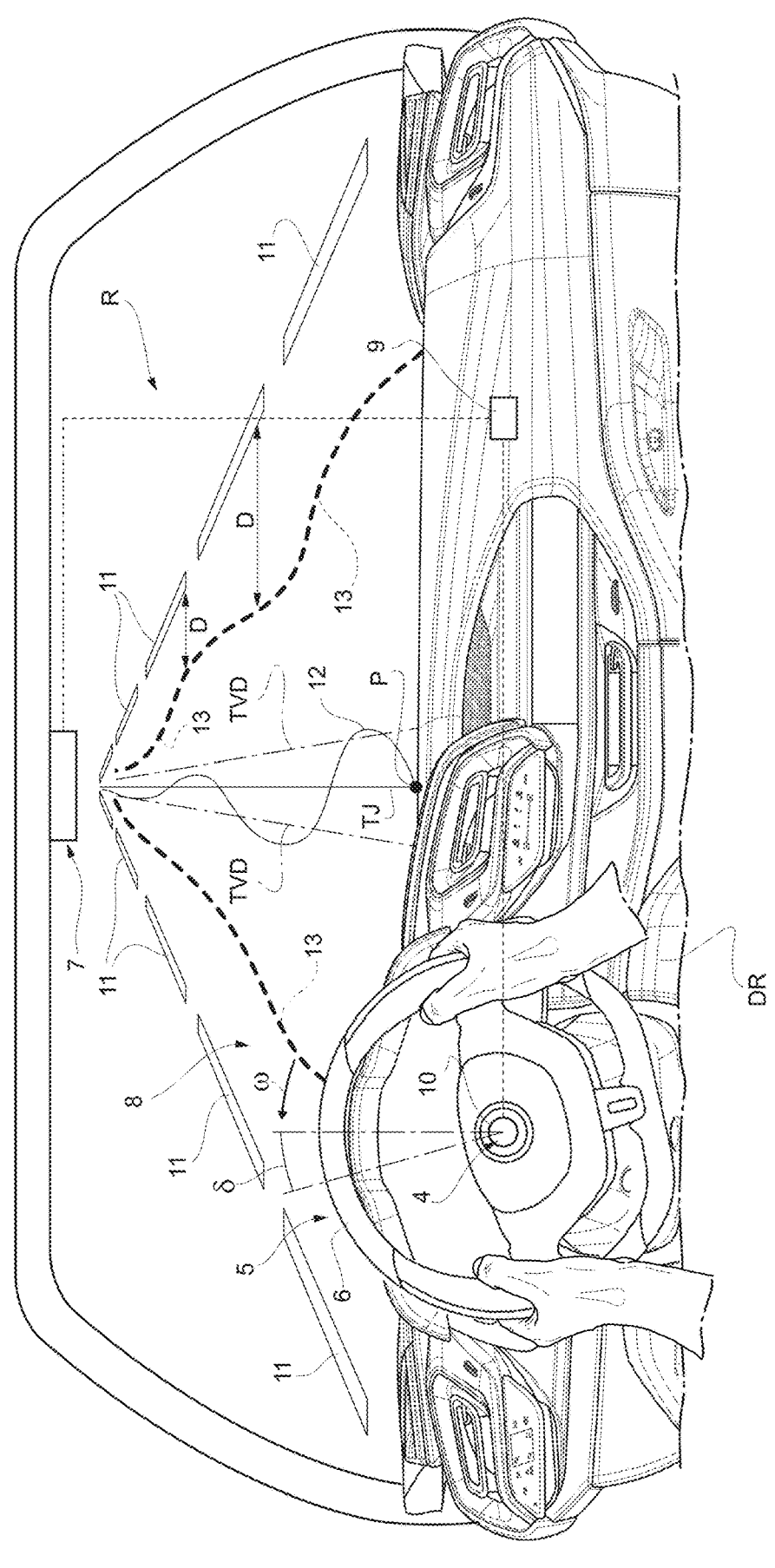
FIG. 2 shows a perspective and schematic view, with details removed for the sake of clarity, from inside the vehicle of FIG. 1 driven by an inattentive or tired driver.

Advantageously, the road vehicle 1 comprises first sensor devices 4 configured to detect at least one steering parameter S relating to the kinematics of a device 5 actuated by the driver DR to steer; for example, a conventional steering wheel 6 as illustrated in FIGS. 1 and 2, or a suitable joystick or cloche.

In particular, the steering parameter S is related to the steering angle δ and/or to the steering speed ω of the road vehicle 1.

The wording "steering angle δ" means the angle between the steering position 6 with wheels 2 straight and the current steering position 6 (depending on how much it is rotated by the driver DR around its own central axis of rotation). Obviously, the steering angle δ can also be calculated in an analogous way as a function of the deviation of the front wheels 2 (and possibly of the rear wheels 3, if steered) around the vertical axis, with respect to their straight-line position.

The wording "steering speed ω" means the variation of the steering angle δ over time.

The vehicle 1 also comprises second sensor devices 7, which are configured to detect at least one line parameter L relating to the position P (dynamic) of the road vehicle 1 within a lane 8 (illustrated schematically in FIGS. 1 and 2).

Advantageously, the vehicle also comprises a control unit 9, also referred to as an electronic control unit including a processor and memory for receiving and storing electronic signals as is well known in the art, which is configured to process a steering index IS as a function of the at least one steering parameter S detected and a line index IL as a function of the at least one parameter L of line detected.

Furthermore, the control unit 9 is configured to process, as a function of a combination between the steering index IS and the line index IL, an index IDA of driver DR tiredness/attention, which quantitatively (i.e. numerically) indicates the drowsiness/attention level of the driver, for example according to known evaluation scales, and therefore not more detailed (such as the KSS scale).

Physically, the control unit 9 can be composed of a single device or of several devices separated from each other and communicating through a local network (for example CAN or ethernet) of the road vehicle 1.

As illustrated in the non-limiting embodiments of FIGS. 1 and 2, preferably without limitation, the first sensor devices 4 comprise sensor elements 10 at the wheels 2 and/or the steering wheel 6, while the second sensor devices 7 comprise cameras and/or radio or laser devices (e.g., lidar or radar).

In FIG. 1, the vehicle 1 driven by the driver DR inside the lane 8 (usually delimited by suitable demarcation lines 11) is shown without limitation. In particular, this figure illustrates the travelling 12 of the road vehicle 1 (in particular the tracks 13 which will follow the wheels 2, 3) in the event that the driver DR is focused and alert (i.e., is not subject to particular drowsiness, tiredness, or distraction). It can therefore be understood how, in these conditions, the position P of the vehicle remains substantially on the ideal trajectory TJ, as well as the distance D of the vehicle (in particular of the tracks 13) from the lines 11 which delimit the lane 8.

On the contrary, FIG. 2 illustrates the travelling 12 of the road vehicle 1 (and in particular the tracks 13 which will follow the wheels 2, 3) in the event that the driver DR is tired and distracted (i.e., subject to drowsiness, tiredness or distracted from something external to driving). It can therefore be understood how, in these conditions, the position P of the vehicle turns out to be variable with respect to the ideal trajectory TJ, as well as the distance D of the vehicle (in particular of the tracks 13) from the lines 11 which delimit the lane 8.

In accordance with a further aspect of the present invention, a method for determining the drowsiness/attention level of the driver DR of a road vehicle 1, is provided.

The method provides (for example by means of the first sensor devices 4) the step of detecting the steering parameter S relating to the kinematics of the device 5; where the steering parameter S is relative (that is, it is calculated as a function of) the steering angle δ and/or the steering speed ω (ω) of the road vehicle 1.

The method also provides for the following step of processing the steering index IS as a function of the previously detected steering parameter S.

Contextually, the method provides for the step of detecting the line parameter L relating to the position P of the road vehicle 1 within the lane 8; and the step of processing the line index IL as a function of the previously detected line parameter L.

Advantageously, the method further comprises the step of processing, i.e., calculating numerically, by means of the control unit 9, the driver DR tiredness/attention index IDA as a function of a combination between the steering index IS and the line index IL.

According to some preferred non-limiting embodiments, the steering index IS (illustrated in FIG. 4*c*) and/or the line index IL (illustrated in FIG. 4*a*) are calculated according to a respective PIS, punctual detection PIL (illustrated in FIGS. 4*a* and 5*a*) of the steering parameter S and/or of the line parameter L, respectively, and a base detection BIS, BIL (illustrated in FIGS. 4*b* and 5*b*) of the steering parameter S and/or line parameter L, respectively. In particular, the base detection BIS, BIL serves as a reference (benchmark) for calibrating the steering IS and line IL indices respectively, characterizing them for each user, allowing differences in age, build, driving skills, reflexes, etc. to be ignored.

In this description, the term "punctual detection" means a detection relating to driving in progress, i.e., current.

Figure 4:
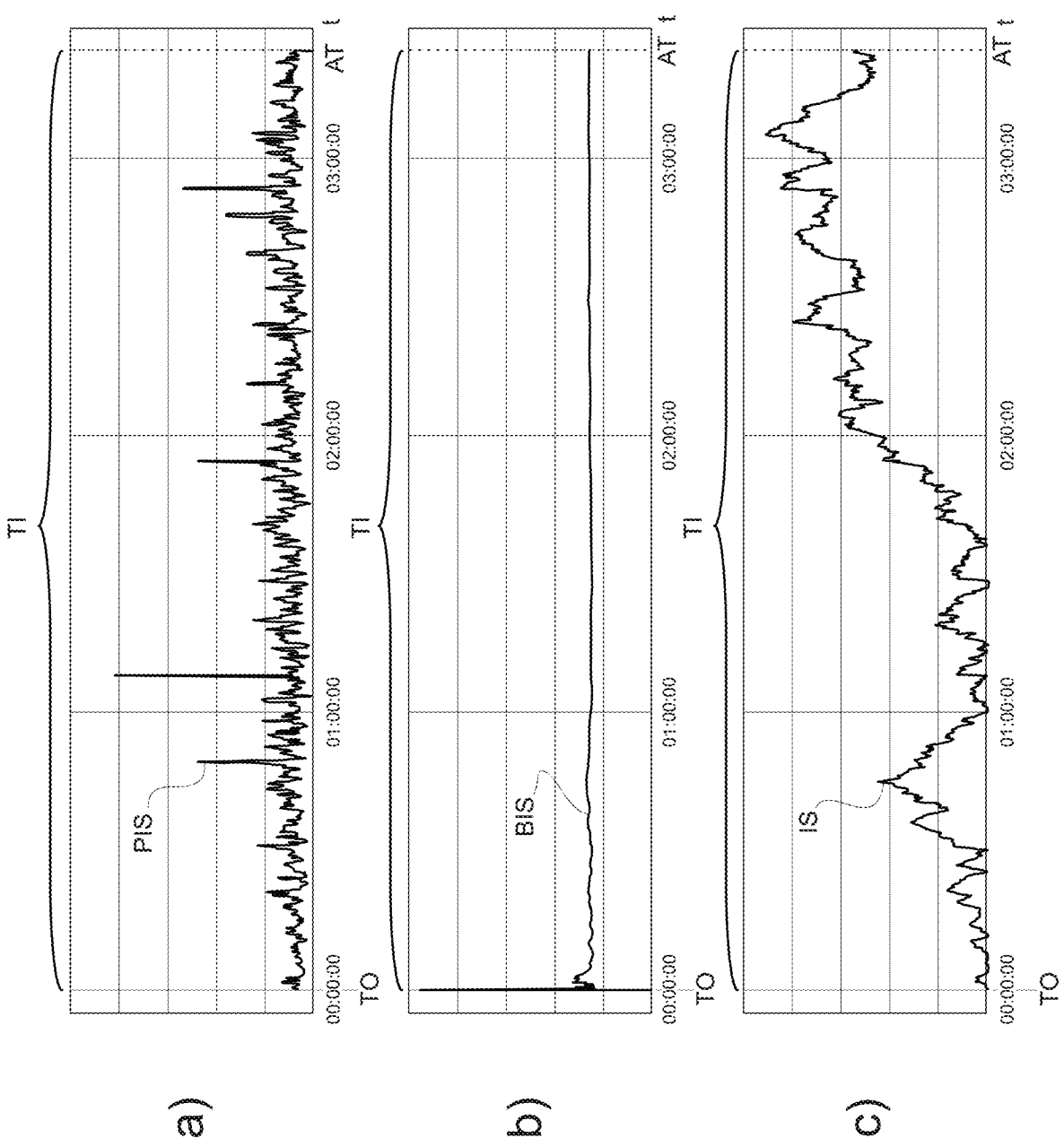
FIG. 4 illustrates three plots relating to the steering index, the first of which shows an absolute punctual detection, the second of which shows a base detection and the third of which shows a characterized detection derived from the first and second one.
Figure 5:
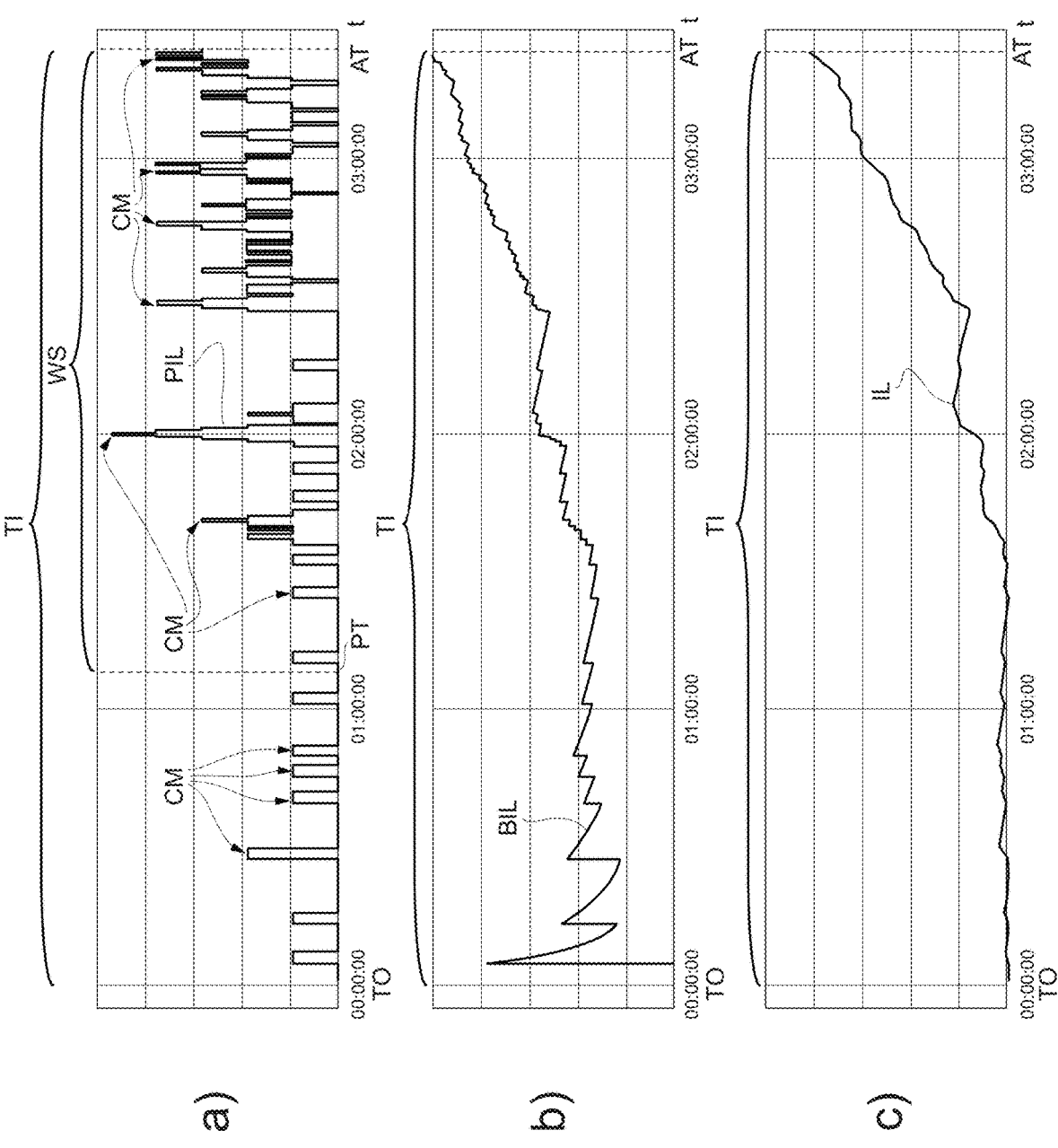
FIG. 5 illustrates three plots relating to a line index the first of which shows an absolute punctual detection, the second of which shows a base detection and the third of which shows a characterized detection derived from the first and the second one.

In some preferred non-limiting cases, such as those illustrated in FIGS. 4*b* and 5*b*, the base detection BIS, BIL serves as a reference for characterizing the driver DR, each time the vehicle 1 is turned on and driving is started. In this way, it is also possible to take into account from time to time the evolution of the driving style of the driver DR according to his conditions, will and habits of the moment.

In other non-limiting and non-illustrated cases, the driver is characterized once and the base detection BIS, BIL is performed once for each driver DR and not each time the vehicle is switched on. In these cases, the driver DR can then be recognized by means of known systems such as the key he uses, the cell phone, facial recognition using a video camera inside the vehicle 1, etc.

Advantageously but not necessarily, the steering index IS and/or the line index IL are calculated according to the difference between the respective PIS, punctual detection PIL and the respective base detection BIS, BIL. In particular, the steering index IS and/or the line index IL are calculated as the integral over time of the difference between the respective PIS, punctual detection PIL and the respective base detection BIS, BIL.

In other words, preferably but not in a limiting way, the steering index IS according to what is illustrated in the non-limiting embodiment of FIG. 4*c* is calculated according to the formula: IS=$\int$(BIS−PIS)dt; and the line index IL as illustrated in the non-limiting embodiment of FIG. 5*c* is calculated according to the formula: THE=$\int$(BIL−PIL)dt.

Advantageously, but not necessarily, and as illustrated in the non-limiting embodiment of FIG. 4*b*, the base detection BIS of the steering parameter S is calculated as a function of the average (arithmetic) of the value of the punctual PIS detection of the steering parameter for a given period TI of time, in particular from the start TO of driving to the current time AT.

Figure 3:
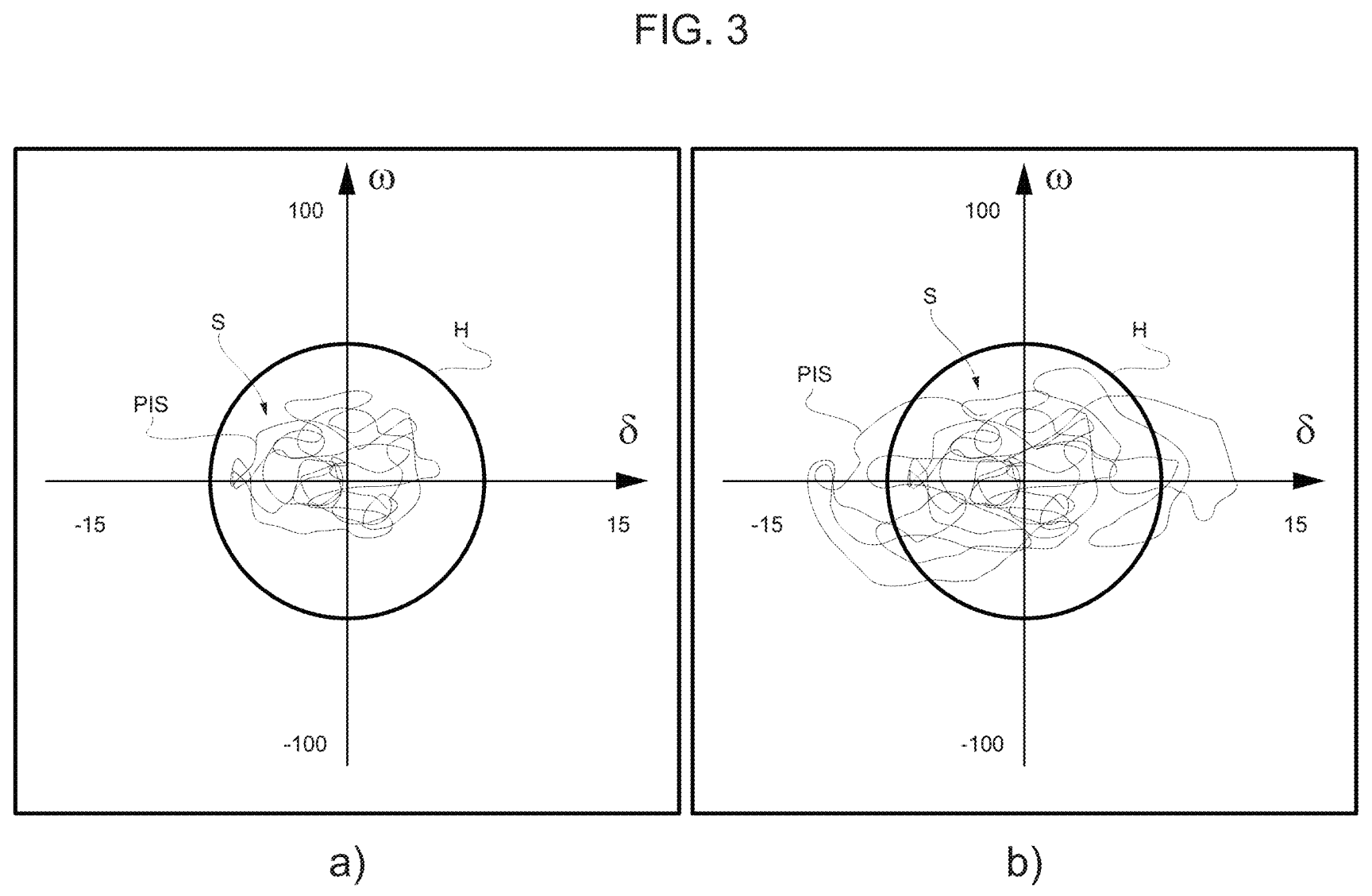

According to some preferred non-limiting embodiments, such as those illustrated in FIGS. 3*a*, 3*b* and 4*a*, the punctual PIS detection of the steering parameter S is calculated as a function of the square root of the sum of the squares of the steering angle δ and the speed ω of steering. In other words, preferably, the punctual PIS detection of the steering parameter S is calculated according to the formula:

$$PIS = \sqrt{\delta^2 + \omega^2}.$$

Advantageously but not necessarily, the punctual PIS detection of the steering parameter S is calculated in relation to the angle δ and the speed ω detected while traveling along a straight lane 8.

In particular, as can be seen from FIG. 3*a*, the punctual PIS detection of the steering parameter S tends to remain within a tolerance horizon H in the event that (as in FIG. 1) the driver DR is focused and vigilant (or is not subject to particular drowsiness, tiredness or distraction). Therefore, it can be understood how, in these conditions, the driver DR keeps the steering wheel 6 substantially in the central position (δ≈0) and the corrections he makes are at low speed (ω≈0).

On the other hand, as can be seen from FIG. 3*b*, the punctual PIS detection of the steering parameter S tends to go outside the defined circle of the tolerance horizon H in the event that (as in FIG. 2) the driver DR is not focused and vigilant (i.e., is affected by evident sleepiness, tiredness or distractions). Therefore, it can be understood how, in these conditions, the driver DR often corrects the position of the steering wheel 6 (increasing the positive and negative values of the steering angle δ) and/or the corrections he makes are sudden (increasing the values in positive and negative of the steering speed ω).

Advantageously but not necessarily, and as illustrated in the non-limiting embodiment of FIG. 5*b*, the base detection BIL of the line parameter L is calculated as a function of the frequency of critical CM manoeuvres (represented by the peaks present in the plots of FIG. 5*a*) of the punctual detection PIL of the line parameter L for a specific period of time TI, in particular, also from the start TO of the driving to the current time AT.

According to some non-limiting embodiments, the critical CM manoeuvres include moving away beyond a first TVD threshold from the ideal TJ trajectory of vehicle 1 inside lane 8.

Alternatively, or additionally, critical CM manoeuvres include an excessive approach to the lines 11 which delimit the lane 8.

Alternatively, or additionally, the critical CM manoeuvres comprise a sudden correction by the driver DR which brings the road vehicle 1 back to the optimal trajectory TJ.

Therefore, preferably but not in a limiting way, the base detection BIL of the line parameter L is calculated according to the formula:

$$BIL = \frac{NCM(AT)}{AT - TO} * 60$$

which indicates the NCM number of critical operations CM per minute from the initial time TO to the current time AT; where NCM(AT) indicates the total number of critical CM manoeuvres at the current time AT.

According to some preferred non-limiting embodiments, such as those illustrated in FIG. 5*a*, the punctual detection PIL of the line parameter L is calculated as a function of the frequency of critical manoeuvres performed by the driver DR for a mobile time window WS ranging from the current time AT at a past time PT.

Therefore, preferably but not in a limiting way, the punctual detection PIL of the line parameter L is calculated according to the formula:

$$PIL = \frac{No}{WS} * 60$$

which indicates the number N of critical CM manoeuvres per minute performed within the mobile time window WS.

In particular, the mobile time window WS is greater than one minute, preferably greater than two minutes, in detail equal to or greater than three minutes. In this way, the driver DR is allowed to compensate for a fleeting inattention without continuously receiving warnings from vehicle 1.

Advantageously but not necessarily, the punctual detection PIL of the line parameter L is (also) calculated in relation to the critical manoeuvres CM carried out while traveling along a straight lane 8.

According to some preferred non-limiting embodiments, the driver tiredness/attention index IDA is calculated as a function of a driving index IG, which is given by the weighted sum of the steering index IS and the line index IL. In other words, the driving index GI is calculated according to the formula $$IDA = \propto IS + \beta IL,$$

where $\alpha$ and $\beta$ represent the weights of the steering index IS and the line index IL, respectively.

In particular, the weight $\alpha$ of the steering index IS and the weight $\beta$ of the line index IL are defined by means of experimental tests. In detail, the $\alpha$ and $\beta$ weights allow the indexes IS and IL to be calibrated in order to adapt the value of the tiredness/attention index IDA to the scale to be used as a reference (for example, but not limited to, the KSS scale).

Furthermore, advantageously but not necessarily, the driver tiredness/attention index IDA is calculated by considering a sensitivity function SF, which increases or decreases the value of the tiredness/attention index IDA as a function of boundary conditions.

In particular, the boundary conditions are parameters external to the behaviour of the vehicle (current and past). In other words, boundary conditions are external conditions that can affect driving and the driver's normal attention.

Advantageously without limitation, the boundary conditions are the driving duration t (which can lead to an increase in tiredness/inattention; therefore, the greater the driving duration t, the greater the sensitivity function SF, which increases accordingly the value of the index IDA) and/or the time of day (during the night it is more probable that you will feel tired; therefore, the more advanced the time of day is, i.e. the more you advance in the evening/night, the greater will be the sensitivity function SF, which consequently increases the value of the index IDA) and/or the presence of passengers in the road vehicle (which can have a beneficial impact on driver DR tiredness, keeping it active; therefore, the higher the number of passengers, the lower the sensitivity function SF, which consequently decreases the value of the index IDA) and/or the use of driving assistants (which make a drop in attention more probable; therefore, the higher the level of assistance, the greater the sensitivity function SF, which consequently increases the value of the index IDA), of level 2 or lower.

In other words, the tiredness/attention index IDA is calculated by multiplying the driving index GI indicated above by the function SF, i.e. according to the formula IDA=IG*SF. In this way, it is possible, even for the same driver DR, to further refine the value of the tiredness/attention index IDA based on external conditions that can influence driving and the driver's normal attention.

Figure 6:
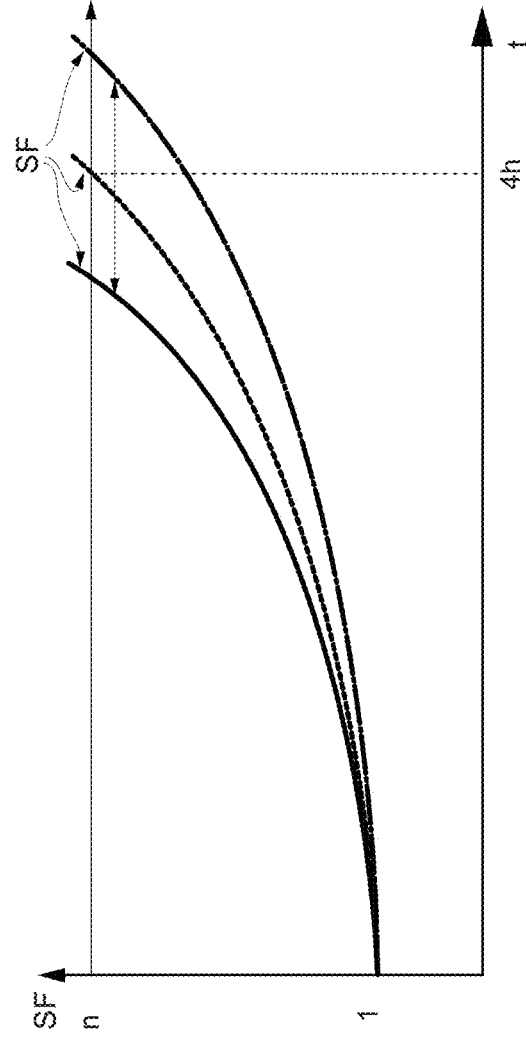
FIG. 6 illustrates a plot related to a sensitivity function used to consider boundary conditions in calculating of a driver tiredness/attention index.

According to some preferred embodiments, such as the one illustrated in FIG. 6, the sensitivity function SF has a substantially parabolic course a, the course of which (always starting from a value equal to 1) with driving time t equal to zero, is offset as a function of the aforementioned boundary conditions.

Figure 7:
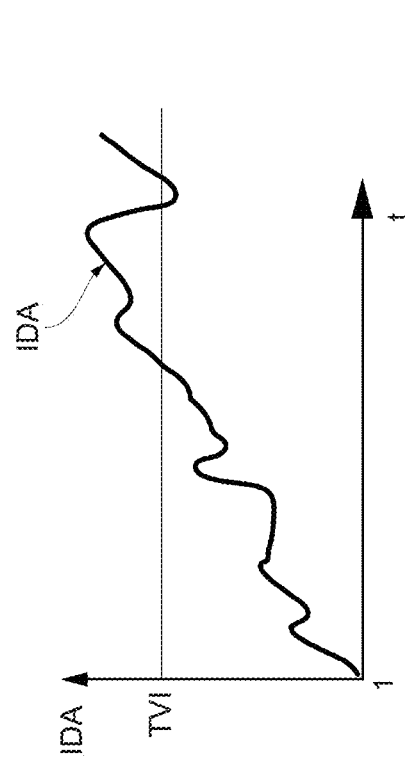
FIG. 7 illustrates a plot relating to the driver tiredness/attention index calculated considering the steering index, the line index and the sensitivity function.

Advantageously but not necessarily, and as illustrated in the non-limiting embodiment of FIG. 7, the method comprises the further step of alerting the driver DR or actuating actuators (for example light, sound, haptic or vehicle brakes) in the event where the sleepiness/attention index IDA exceeds a certain second threshold value TVI. For example, the driver can be warned according to the common light signal in a cup-like shape, or by means of an acoustic or haptic warning.

In some preferred non-limiting cases, the second threshold value TVI corresponds to the value 7 of the KSS scale.

Figure 8:
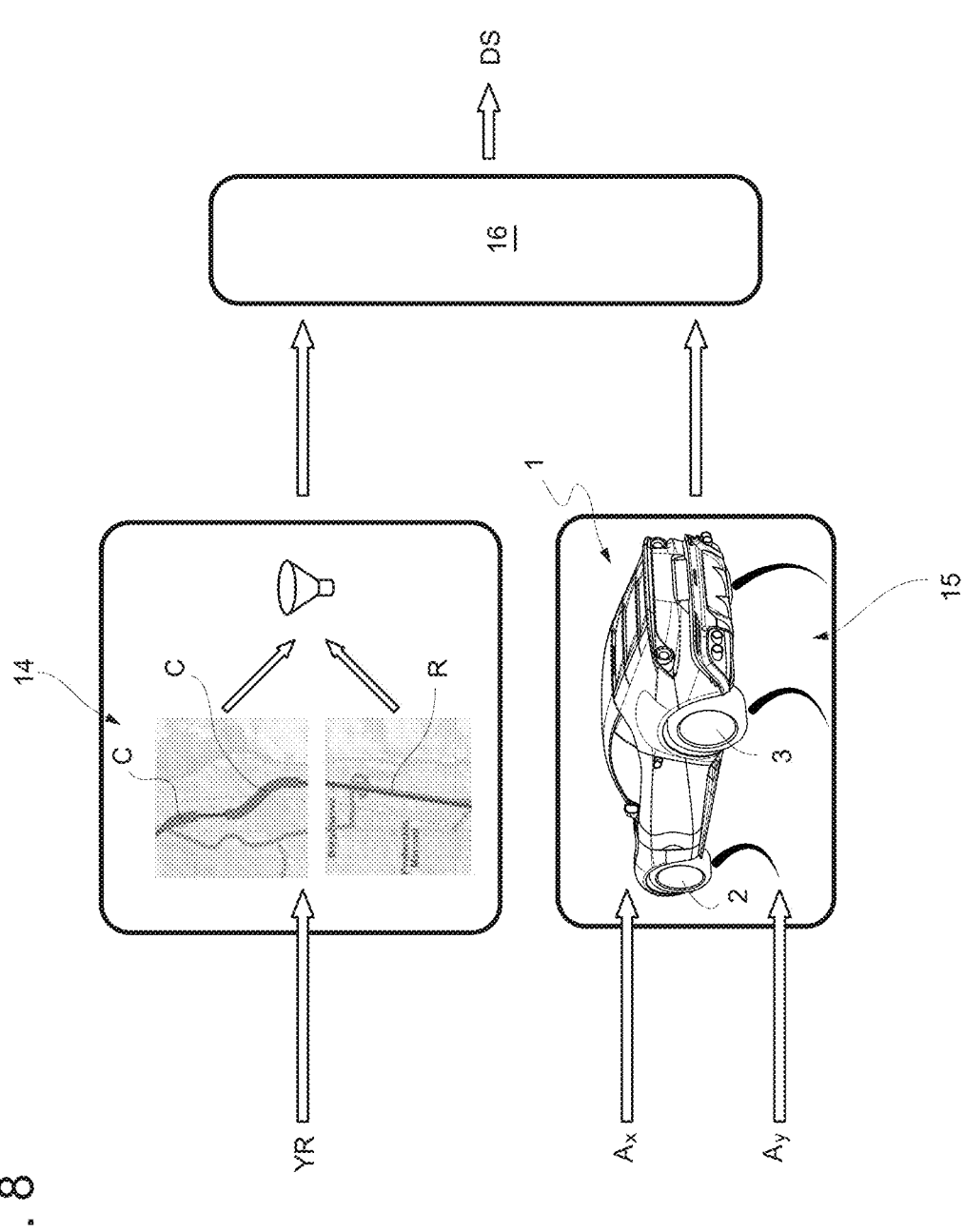
FIG. 8 illustrates a logic diagram for determining whether to activate or deactivate the calculation of the driver tiredness/attention index.

Advantageously but not necessarily, and as illustrated in the non-limiting embodiment of FIG. 8, the method provides for generating a signal DS to interrupt the detection of the steering parameter IS and the line parameter IL or in any case the calculation of the tiredness/attention index IDA.

In particular, the detection of the steering parameter IS and the line parameter IL (or even just the calculation of the tiredness/attention index IDA) is interrupted according to the road travelled by the road vehicle and/or according to the driving style of the driver DR. Preferably, the detection of the steering parameter IS and the line parameter IL (or even just the calculation of the tiredness/attention index IDA) is interrupted while traveling through curves C and/or if the driver has a sporty or reckless driving style.

In the non-limiting embodiment of FIG. 8, the block 14 indicates a phase of detection of the curves C or of straight stretches R (for example as a function of the yaw rate YR of the road vehicle 1). In the case of C curves, the aforementioned detection or calculation is interrupted, as there is no standard for driving curves followed by all driver DRs and predictable, and because driving skills may be different from a driver DR to the other, and because the same driver DR could tackle the right-hand C curves differently from the left-hand C curves, compromising an effective calculation of the tiredness/attention index.

Furthermore, block 15 indicates a phase for detecting the driving style of the driver DR, for example by means of the longitudinal accelerations Ax and lateral Ay of the road vehicle 1 over time. In the event that voluntary sporty or reckless driving is detected, the aforementioned detection or the aforementioned calculation are interrupted, as the driver voluntarily decides not to respect the centre of the lane, potentially even in straight R sections, and to adopt dynamic driving, the which is usually a sign of non-drowsiness of driver DR himself/herself.

Finally, block 16 carries out a simple OR logic operation, with which, upon the occurrence of one of the two conditions indicated above, the deactivation signal DS is sent.

Obviously, the aforementioned logic can be inverted in a known way and therefore not further detailed below, such as providing an activation signal active only if no curve C or no sports/reckless driving by the driver is detected.

In some non-limiting cases, the detection of the steering index IS are interrupted or excluded in the presence of curves C, while the readings of the line index continue to be considered, but with a modified distance D from the lines 11, i.e., with a first less stringent threshold TVD value.

Preferably but not in a limiting way, the detection of the steering index IS and the line index IL is carried out continuously, as is the calculation of the tiredness/attention index IDA.

In use, in the absence of the aforementioned conditions of exclusion/interruption of readings or calculations, the vehicle continuously calculates the tiredness/attention index IDA, adapting it to the different conditions and to the different driver DRs (which will generate different base detections BIS, BIL). In this way, the vehicle 1, by means of the control unit 9, is able to know any improvements or worsening in the driver attention/drowsiness.

If the tiredness/attention index IDA value exceeds the second threshold value TVI, the driver DR is warned, and a break is recommended.

Advantageously, the vehicle 1 is configured to carry out the method described up to now.

Although the invention described above makes particular reference to a very precise example of embodiment, it is not to be considered limited to this example of embodiment, as all those variants, modifications or simplifications covered by the attached claims fall within its scope, such as for example a different type of road vehicle, a different arrangement of the sensor elements, a different calculation method or different boundary conditions, different manoeuvres considered critical, different systems for signalling lack of attention or drowsiness, etc.

The method and vehicle described above have numerous advantages.

First, it allows you to protect the safety of vehicles, drivers, and passengers in a particularly efficient way, by understanding and warning the driver in the event of dangerous driving conditions.

Furthermore, by characterizing the driver, falling into statistical biases is avoided, which could lead to errors for drivers who deviate from the average in terms of style and habits.

A further advantage of the present invention lies in allowing a punctual characterization of the driver at each new drive, thus making it possible to render irrelevant even changes in the driving activity even of the same driver.

In addition, the present invention allows the tiredness/drowsiness parameter to be calibrated also as a function of boundary conditions which normally alter the effective ability of the driver and could cause false negatives or false positives, warning the driver DR incorrectly or not.

Finally, the method described above is simple and economical to implement in a road vehicle 1, since it does not require the addition of any component and can be completely implemented via software by exploiting the architectures already normally present on board the modern road vehicle 1. It is important to note that the method described above requires neither a high calculation capacity nor a large amount of memory and therefore its implementation is possible in a known control unit without the need for updates or upgrades.

LIST OF FIGURE
REFERENCE NUMBERS

| | |
|---|---|
| 1 | vehicle |
| 2 | front wheels |
| 3 | rear wheels |
| 4 | first sensor devices |
| 5 | steering device |
| 6 | steering |
| 7 | second sensor devices |
| 8 | lane |
| 9 | control unit |
| 10 | sensor elements |
| 11 | demarcation lines |
| 12 | travelling |
| 13 | tracks |
| 14 | block |
| 15 | block |
| 16 | block |
| AT | current time |
| Ax | acceleration |
| Ay | acceleration |

-continued

LIST OF FIGURE
REFERENCE NUMBERS

| | |
|---|---|
| BIL | base detection L |
| BIS | base detection S |
| C | curves |
| CM | critical manoeuvres |
| D | distance from the lines |
| DR | driver |
| DS | deactivation signal |
| H | horizon |
| IDA | tiredness index |
| IL | line index |
| IS | steering index |
| L | line parameter |
| P | vehicle location |
| PIL | punctual detection L |
| PIS | punctual detection S |
| PT | past time |
| R | straight sections |
| ST | steering parameter |
| SF | sensitivity function |
| t | driving duration |
| TI | time period |
| TJ | ideal trajectory |
| TO | start of driving |
| TVD | first threshold value |
| TVI | second threshold value |
| YR | yaw rate |
| WS | time window |
| δ | steering angle |
| ω | steering speed |

The invention claimed is:

1. A method for determining the drowsiness/attention level of the driver (DR) of a road vehicle (1); the method comprises the steps of:

detecting at least one steering parameter (S) related to the kinematics of a driver-operated device (DR) for steering; wherein the steering parameter (S) is related to the steering angle ($\delta$) and/or the steering speed ($\omega$) of the road vehicle (1);

elaborating a steering index (IS) as a function of the at least one steering parameter (S) detected;

detecting at least one line parameter (L) related to the position (P) of the road vehicle (1) within a lane (8);

processing a line index (IL) as a function of the at least one line parameter (L) detected; and processing a driver (DR) drowsiness/attention index (IDA) as a function of a combination of the steering index (IS) and the line index (IL);

adjusting the drowsiness/attention index (IDA) by a sensitivity function (SF) that increases or decreases the value of the drowsiness/attention index (IDA) as a function of boundary conditions comprising at least one of: driving duration, time of day, presence of passengers in the road vehicle (1), or use of driving assistants; and when the drowsiness/attention index (IDA) as adjusted by the sensitivity function (SF) exceeds a predetermined threshold, actuating actuators to provide braking and/or haptic feedback;

characterized in that the steering index (IS) and/or the line index (IL) are calculated as a function of a respective punctual detection (PIS, PIL) of the steering parameter (S) and/or the line parameter (L) respectively and a respective base detection (BIS, BIL) of the steering parameter (S) and/or the line parameter (L) respectively; and further characterized in that the punctual detection (PIS) of the steering parameter (S) is calculated as a function of the square root of the sum of the squares of the steering angle (δ) and the steering speed (ω) according to formula: $PIS=\sqrt{(\delta^2+\omega^2)}$.

2. The method according to claim 1, wherein the steering index (IS) and/or the line index (IL) are calculated as a function of the difference between the respective base detection (BIS, BIL) and the respective punctual detection (PIS, PIL), in particular the steering index (IS) and/or the line index (IL) are calculated as the integral over time of the difference between the respective base detection (BIS, BIL) and the respective punctual detection (PIS, PIL).

3. The method according to claim 1, wherein the base detection (BIS) of the steering parameter (S) is calculated as a function of the average of the punctual detection (PIS) of the steering parameter (S) during a certain time interval (TI), in particular from the beginning (TO) of the driving to the current time (AT).

4. The method according to claim 1, wherein the base detection (BIL) of the line parameter (L) is calculated as a function of the frequency of critical manoeuvres (CM) performed by the driver (DR) during a given time interval (TI), in particular from the start (TO) of driving to the current time (AT).

5. The method according to claim 1, wherein the punctual detection (PIL) of the line parameter (L) is calculated as a function of the frequency of critical manoeuvres (CM) performed by the driver (DR) during a moving time window (WS) ranging from the current time (AT) to a past time (PT).

6. The method according to claim 5, wherein the moving time window (WS) is greater than one minute.

7. The method according to claim 1, wherein the drowsiness/attention index (IDA) of the driver (DR) is calculated as a function of a driving index, which is given by the weighted sum of the steering index (IS) and the line index (IL); in particular, the weight of the steering index (IS) and the weight of the line index (IL) are defined by means of experimental tests.

8. The method according to claim 4, wherein the critical manoeuvres (CM) comprise:
a departure beyond a first threshold value (TVD) from the ideal trajectory (TJ) of the vehicle (1) within the lane (8); and/or
an excessive approach to the lines (11) demarcating the lane (8); and/or
a sudden correction that returns the road vehicle (1) to its optimum trajectory.

9. The method according to claim 1, wherein the detection of the steering parameter (S) and the line parameter (L), or the calculation of the drowsiness/attention index (IDA), is interrupted depending on the road travelled by the road vehicle (1) and/or depending on the driving style of the driver (DR); in particular, the detection of the steering parameter (S) and the line parameter (L), or the calculation of the drowsiness/attention index (IDA), are interrupted while driving through curves (C) and/or if the driver (DR) has a sporty or hazardous driving style.

10. The method according to claim 1 and comprising the further step of alerting the driver (DR) if the drowsiness/attention index exceeds a second threshold value (TVI).

11. A road vehicle (1) comprising:
four wheels (2, 3), of which at least one pair is driven;
first sensors devices (4) configured to detect at least one steering parameter (S) related to the kinematics of a driver-operated device (DR) for steering; where the steering parameter (S) is related to the steering angle (δ) and/or the steering speed (ω) of the road vehicle (1);
second sensors devices (7) configured to detect at least one line parameter (L) relative to the position (P) of the road vehicle (1) within a lane (8); and
an electronic control unit (9) configured to receive sensor signals for:
processing a steering index (IS) according to the at least one steering parameter (S) detected; and a line index (IL) according to the at least one line parameter (L) detected;
processing a driver (DR) drowsiness/attention index (IDA) as a function of a combination of the steering index (IS) and the line index (IL) by adjusting the drowsiness/attention index (IDA) using a sensitivity function (SF) that increases or decreases the value of the drowsiness/attention index (IDA) as a function of boundary conditions comprising at least one of: driving duration, time of day, presence of passengers in the road vehicle (1), or use of driving assistants; and
when the drowsiness/attention index (IDA) as adjusted by the sensitivity function (SF) exceeds a predetermined threshold, actuating actuators to provide braking and/or haptic feedback;
characterized in that the steering index (IS) and/or the line index (IL) are calculated as a function of a respective punctual detection (PIS, PIL) of the steering parameter (S) and/or the line parameter (L) respectively and a respective base detection BIS, BIL) of the steering parameter (S) and/or the line parameter (L) respectively; and
further characterized in that the punctual detection (PIS) of the steering parameter (S) is calculated as a function of the square root of the sum of the squares of the steering angle (δ) and the steering speed (ω) according to formula: $PIS=\sqrt{(\delta^2+\omega^2)}$.

12. The road vehicle (1) according to claim 11, wherein the first sensors devices (4) comprise sensors elements (10) at the wheels (2, 3) and/or steering; and wherein the second sensors devices (7) comprise cameras and/or radio or laser devices.

* * * * *